Patented Mar. 15, 1949

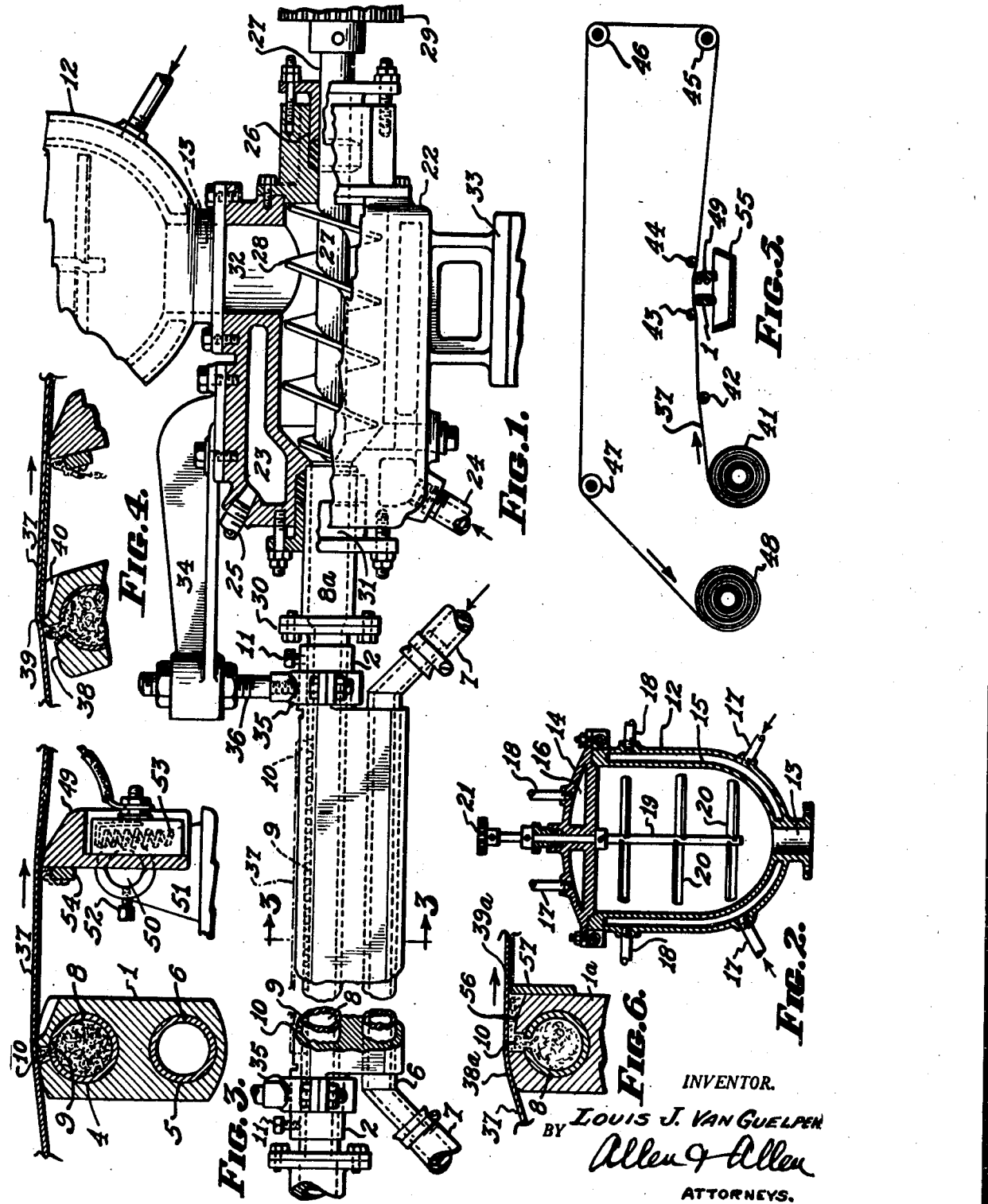

2,464,771

UNITED STATES PATENT OFFICE 2,464,771

APPARATUS FOR COATING WEBS

Louis J. Van Guelpen, Middletown, Ohio, assignor to The Interstate Folding Box Company, Middletown, Ohio, a corporation of Ohio Application April 9, 1946, Serial No. 660,778

10 Claims. (Cl. 91—43)

The principal object of the invention is the provision of improved mechanism for imposing coatings, particularly of thermoplastic substances, upon webs.

It is an object of the invention to provide a mechanism in which the amount of coating applied can be controlled very accurately and in a wide range, for example from 6 to 60 pounds per ream.

It is an object of the invention to provide a mechanism which will coat a web in a much more uniform and less streaky fashion. One of the difficulties encountered in previous coating devices is that small particles of foreign matter lodge in the mechanism, producing streaks in the applied material. In my machine these particles are readily released without interruption of the operation and without disrupting or affecting materially the amount of the coating.

Yet another object of the invention is to provide a mechanism suitable for applying coating materials which have a tendency to break down, lose viscosity and become tacky when handled in the conventional way. As an example of a material difficult, if not impossible, to coat on customary apparatus, I refer to a typical formula consisting of "Tervan #349" (25 parts isobutylene polymer of a medium molecular weight of 80,000 to 100,000 and 75 parts paraffin of 132° F. softening point) to which 10% paraffin of 145° F. softening point has been added. This is a viscous and heavy mixture. It can readily be coated on my machine without deterioration. I take this to be due to a lack of the milling action frequently found in coating apparatus.

My invention may also be employed, for example, in imposing smooth, even coatings of wax or waxy substances upon paper or boxboard, and in this connection it may be noted that it is capable of forming the thin, superficial, imperforate films of a mixture of micro-crystalline and paraffin waxes required to produce commercial proofness against both moisture and water-vapor and vegetable and animal fats and oils, in accordance with the teachings of the copending application of Samuel Bergstein, Ser. No. 549,480, filed August 14, 1944, now Patent No. 2,443,221, issued June 15, 1948.

The utility of my apparatus is not confined to the coating of fibrous or porous webs, but may with equal facility be used to coat the non-fibrous films of commerce; and the word "web" is hereinafter used generically. Also, its use is not confined to the application of thermoplastics, since other substances, including solvent-softened substances may be employed.

Yet, it is an ancillary object of the invention to provide an apparatus which will handle coating substances at elevated temperatures, and which will maintain them at the desired temperatures both during coating and during temporary periods of inactivity of the apparatus.

These and other objects of the invention which will be set forth hereinafter or will be apparent to one skilled in the art as the description proceeds, I accomplish by that construction and arrangement of parts of which I shall now describe an exemplary embodiment. Reference is made to the drawings wherein:

Figure 1 is a partial elevational view of my apparatus with certain elements sectioned in part.

Figure 2 is a vertical sectional view of the reservoir.

Figure 3 is a sectional view of the coating head and heated smoothing bar taken along the line 3—3 of Figure 1.

Figure 4 is a similar, partial section showing the elements in a different adjustment.

Figure 5 is a diagrammatic view showing a relationship of my apparatus to web handling equipment.

Figure 6 is a partial sectional view of another form of coating head.

In the practice of my invention, I provide a coating head 1, which is a metallic body having trunnions 2 at its ends. It is provided with longitudinal holes or bores as at 4 and 5, the first of these being coaxial with the trunnions. The bore 5 is either lined with a tube 6 for the passage of steam or other heating fluid, or is provided with fittings at its ends for the same purpose. The heating fluid may be supplied by flexible conduits 7 to allow for the rocking of the head.

A tube 8 passes through the bore and extends beyond the trunnions 2. The tube has a longitudinal series of holes or apertures 9 in its uppermost portion, and the head 1 is slotted as at 10. The head may be turned on the tube 8; and it will be seen that by adjusting the position of the tube 8 within the head, the effective area of the apertures through which material from the tube 8 may issue into the slot 10 can be varied. Set screws 11 or other clamping means may be employed to fix the relative positions of the tube and head. Thus the tube 8 can be turned in the head to control coating flow and then locked in the desired position, whereupon the head can be tilted or rocked on its trunnions, as will be explained hereinafter, without altering the relative positions of the head and tube. The length of the line of openings 9 and the slot 10 will be approximately the width of the widest web to be coated.

The line of apertures or holes 9 in the tube need not be a straight line; and in practice I prefer to form them in a slight arc or curve, starting at one position and gradually curving in one direction as the center is approached, and then gradually curving in the opposite direction as the opposite end is approached. As a result, when the tube is turned in the head, the apertures at the outer ends may be blocked off first while the perforations in the center may not be blocked at all. This provides an exceptionally accurate control of the coating flow, and is a valuable feature especially where highly viscous coating substances are employed.

Another mode of coating control comprises varying the size of the apertures themselves. For example, the perforations near the ends may be made small, their size gradually increasing toward the center.

Coating material will be fed to the tube 8 from suitable reservoir means, preferably as shown in Figure 2 comprising a hollow body 12 with a bottom outlet 13 and a cover 14. The body has a jacket 15 and the cover a jacket 16 equipped respectively with inlet conduits 17 and outlet conduits 18 for the circulation of steam or other heat-controlling fluid. Preferably the reservoir is equipped with an agitator comprising a shaft 19 journaled in the cover and provided with blades 20. Means for driving the shaft are also provided, a gear being indicated diagrammatically at 21.

The coating material is to be supplied from the reservoir to the tube 8 under sufficient pressure to insure its flow in the volume desired. This may be done by gravity through jacketed conduits, but is preferably done by means acting as a pump of a type producing constant pressure irrespective of flow volume. One such means involves a rotating screw in a housing 22. The housing is equipped with a jacket 23 having inlet and outlet means 24 and 25 for temperature controlling fluid. Through a suitable packing or gland 26, a shaft 27 enters the housing and carries the screw means 28. The outlet of the pump is at the other end of the housing, where a tube 8a, which is an extension of the tube 8, and is connected to it by a flange coupling 30 or other suitable union, enters the housing through a packing or gland 31, wherein it may rotate.

While the parts may be assembled as desired, it is convenient, in an organization such as that herein described, to mount the reservoir on the pump so that its outlet 13 connects directly with the inlet 32 of the pump. The pump in turn may have its base 33 mounted upon the framework of the coating apparatus.

The tube 8 may be fed with the coating material from one end only if desired; but I prefer to feed it from both ends. To do this, I duplicate the reservoir and pump device illustrated in Figure 1 on the other end of the coating head. I also mount the coating head on a pair of arms, one of which is indicated at 34. These arms may conveniently be mounted on the respective pumps. Each arm carries a clamping means 35 engaging one of the trunnions 2 of the coating head. The clamps are suspended from the arms by means of adjustable bolt members 36. Thus the head may be rocked or turned on its trunnions to control the weight or thickness of the coating deposited without disturbing the relationship of the head and the tube 8 which, as has been indicated, controls the flow or delivery of coating substance to the slot in the head. The tube means 8a being rotatable with respect to the pump housings, permit this action.

In Figures 3 and 4, I have shown a web 37 passing over the coating head in the direction of the arrow. The shape of the operating surfaces of the coating head is of great importance. In my preferred embodiment, the upper surface of the coating head is relieved as at 38 on the approach side. This provides a raised portion 39 which acts as a means for spreading the coating material issuing from the slot 10. The surface 38 is substantially lower than the surface 39 to provide a clearance when using viscous materials. The surface 39 is so shaped as to lie oblique to the surface of the web 37 when the head is in vertical position as in Figure 3. The surface of the head may be relieved beyond the portion 39 as indicated at 40. There is a substantial drop between the surface 39 and the adjacent edge of the surface 40; and the surface 40 drops off sharply. This is important, because if there were more breadth of surface 39 in contact with the web 37 in the coated area, there would be a greater amount of drag, tending to cause a feathering out or stringing of the coating. When the head is tilted as in Fig. 4, there is a wedging action of the coating material against the web, producing a thicker, but still uniform coating. Thus, it is possible in my apparatus to control the thickness of the coating by the angular position of the head 1.

A somewhat modified form of coating head is shown at 1a in Figure 6. The relationship of the perforated tube 8 and slot 10 may be the same as before. The surface 38a is not relieved on the approach side. Instead, the opposite side of the head is relieved as at 56. The spreading surface 39a is provided on a doctor member 57 affixed, preferably adjustably, on the head.

The web 37 is designed to be maintained in contact with the coating head by tension. In Figure 5, I have diagrammatically indicated the web as being withdrawn from a roll 41. It is led over a supporting roll 42 and beneath a pair of rolls 43 and 44 located on either side of the coating head 1. Beyond the coating means, the web is passed with its uncoated surface against a series of driven rolls 45, 46, and 47 by which it is conducted to a take up roll 48 through a path of sufficient length to insure thorough setting of the coating. It will be understood that in this path other operations may, if desired, be performed on the web.

With thermoplastic coating substances particularly those of waxy nature, it is desirable to pass the coated web over a heated smoothing bar. This may be a bar 49 mounted for angular adjustment on trunnions 50 journaled in brackets 51 on the frame of the machine. Means 52 to fix the angular position of the smoothing bar are provided. The smoothing bar has a contacting surface or edge shaped in general similarly to the portion 39 of the coating head. Since the smoothing bar not only smooths the coating but also removes some excess, it will be seen that its action may be varied by tilting it on its trunnions in a manner similar to the tilting of the coating head. A tilted position is illustrated in Fig. 4.

The smoothing bar will be provided with suitable heating means such as the electrical heater shown at 53. I find it advantageous also to attach a bar 54 to the face of the smoothing bar 49 and slightly below the smoothing surface thereof on the approach side. Excess material removed from the web will first collect on the shelf provided by the bar 54 so that there will be an excess of the coating material along the bar, and available to increase the thickness of the coating at any undercoated areas.

It is readily possible to supply to the coating head substantially the exact amount of coating substance required, although in actual practice a slight excess is usually supplied. Since there may be some dripping from the coating head and since there will be dripping from the smoothing bar, I prefer to locate both above an overflow pan 55 shown in Fig. 5. The quantity of material fed can be accurately determined by the speed of rotation of the shafts 27. It will also be evident that should the web break or a stoppage of the machine be enforced by any other condition it is merely necessary to stop the rotation of the shafts 27. Thereupon the coating material ceases to flow; the coating material is not lost from the machine; and the coating material is maintained at temperatures and in a condition for immediate resumption of operations. When it is desired to coat webs of less width than the maximum width, I prefer to provide elements which may be inserted in the slot 10 at its ends to diminish its effective length. Again an arcuate line of apertures in the tube 8 may be used to provide an adjustment for narrower webs, since the tube may be so adjusted as to permit flow of the coating medium through the central perforations only, filling the slot with sufficient material to flow outwardly in the slot just far enough for the given width of web at the desired speed of travel.

It will be noted that I have provided for independent control of the angular relationship of the tube and the head and control of the angular relationship of the head and the adjacent plane of the web.

Foreign materials which might otherwise lodge in the coating apparatus, are readily released in my device. For the most part they tend to be released automatically, but particles which stick may be released by slightly tilting the coating head or the smoothing bar and then restoring their adjusted positions; and this may be done without interrupting the coating operation or the production of waste material. The use of my device enables me to control the coating very accurately; and deterioration of coating substances in my device is kept to a minimum.

Modifications may be made in my invention without departing from the spirit of it. Having thus described my invention in an exemplary embodiment, what I claim as new and desire to secure by Letters Patent is:

1. In a machine for coating a web with a viscous medium, a coating head having a slot, a tube within said head having apertures in communication with said slot, means for carrying a web over said head and past said slot, and means for forcing said medium under continuous pressure into said slot and against said web, one portion of said head adjacent said slot projecting beyond the confines of said slot, said projecting portion serving to distribute medium on said web as it is moved over said portion, said projecting portion being of small dimension in the direction of web travel to minimize feathering and stringing, said head having trunnions through which said tube passes, and being tiltable thereon into various angular relationships to said web to vary the thickness of the coating applied to said web, said head and tube being relatively movable to vary the effective areas of said apertures, and means for locking said tube in adjusted position in said head, whereby said head is tiltable without disturbance of said adjustment.

2. In a machine for coating a web with a viscous medium, a coating head having a slot, a tube within said head having apertures in communication with said slot, means for carrying a web over said head and past said slot, and means for forcing said medium under continuous pressure into said slot and against said web, one portion of said head adjacent said slot projecting beyond the confines of said slot, said projecting portion serving to distribute medium on said web as it is moved over said portion, said projecting portion being of small dimension in the direction of web travel to minimize feathering and stringing, said head having trunnions through which said tube passes, and being tiltable thereon into various angular relationships to said web to vary the thickness of the coating applied to said web, said head and tube being relatively movable to vary the effective areas of said apertures, and means for locking said tube in adjusted position in said head, whereby said head is tiltable without disturbance of said adjustment, said apertures being so located with respect to said slot that relative adjustment of the tube and head will result in selective variation of the effective areas of different apertures.

3. In a coating apparatus a longitudinally pivoted and hence tiltable, elongated head having a slot in one surface, said head having a longitudinal bore including a passageway for supplying coating substance to said slot, means providing a distributing surface adjacent said slot and over which a web to be coated may be passed, whereby the tilting of said head will bring said surface into positions to control the thickness of a coating of said coating substance applied to said web by said head, said head having another longitudinal bore equipped with means for supplying a temperature control fluid thereto, the means for supplying coating substance to said head comprising a tube in said first mentioned longitudinal bore, said tube having apertures corresponding substantially with said slot, and said tube being rotatable in said head whereby the effective areas of said apertures may be adjusted.

4. In a coating apparatus a longitudinally pivoted and hence tiltable, elongated head having a slot in one surface, said head having a longitudinal bore including means for supplying coating substance to said slot, means providing a distributing surface adjacent said slot and over which a web to be coated may be passed, whereby the tilting of said head will bring said surface into positions to control the thickness of a coating of said coating substance applied to said web by said head, said head having another longitudinal bore equipped with means for supplying a temperature control fluid thereto, the means for supplying coating substance to said head comprising a tube in said first mentioned longitudinal bore, said tube having apertures corresponding substantially with said slot, and said tube being rotatable in said head whereby the effective area of said apertures may be adjusted, said means for supplying coating substance further comprising pump means rotatably connected to said tube and of a type capable of maintaining constant pressure in spite of variations of flow.

5. In a coating apparatus a longitudinally pivoted and hence tiltable, elongated head having a slot in one surface, said head having a longitudinal bore including means for supplying coating substance to said slot, means providing a distributing surface adjacent said slot and over which a web to be coated may be passed, whereby the tilting of said head will bring said surface into positions to control the thickness of a coating of said coating substance applied to said web by said head, said head having another longitudinal bore equipped with means for supplying a temperature control fluid thereto, the means for supplying coating substance to said head comprising a tube in said first mentioned longitudinal bore, said tube having apertures corresponding substantially with said slot, and said tube being rotatable in said head whereby the effective area of said apertures may be adjusted, said means for supplying coating substance further comprising a pump rotatably connected to said tube and of a type capable of maintaining constant pressure in spite of variations of flow, and reservoir means for coating material connected to said pump, said reservoir means and pump being jacketed for temperature control fluid.

6. In a coating apparatus a tiltable, elongated head having a slot in one surface, said head having a bore including means for supplying coating substance to said slot, means providing a distributing surface adjacent said slot and over which a web to be coated may be passed, whereby the tilting of said head will bring said surface into positions to control the thickness of a coating of said coating substance applied to said web by said head, said head having another longitudinal bore equipped with means for supplying a temperature control fluid thereto, the means for suppling coating substance to said head comprising a tube in said first mentioned bore, said tube having apertures corresponding substantially with said slot, and said tube being rotatively adjustable in said head whereby the effective area of said apertures may be adjusted, said means for supplying coating substance further comprising pump means rotatably connected to said tube and of a type capable of maintaining constant pressure in spite of variations of flow, and reservoir means for coating material connected to said pump, said reservoir means and pump being jacketed for temperature control fluid, said head having trunnions, and mounting means for said trunnions comprising clamps, whereby the angular position of said head may be adjusted, and independent means for fixing the rotative position of said tube in said head, whereby said head may be tilted without disturbance of said position.

7. The structure claimed in claim 6 wherein there is a pump and reservoir on each side of said head, each being connected to an end of said tube.

8. The structure claimed in claim 6 wherein there is a pump and reservoir on each side of said head, each being connected to an end of said tube, said clamping means being attached to supporting arms which in turn are connected respectively to said pumps.

9. The structure claimed in claim 6 wherein there is a pump and reservoir on each side of said head, each being connected to an end of said tube, said clamping means being attached to supporting arms which in turn are connected respectively to said pumps, and a heated smoothing bar tiltably mounted adjacent said head and having a smoothing surface of a shape similar to said distributing surface, whereby the thickness of said coating may be controlled by a tilting of both said head and said smoothing bar.

10. The structure claimed in claim 6 wherein there is a pump and reservoir on each side of said head, each being connected to an end of said tube, said clamping means being attached to supporting arms which in turn are connected respectively to said pumps, and a heated smoothing bar tiltably mounted adjacent said head and having a smoothing surface of a shape similar to said distributing surface whereby the thickness of said coating may be controlled by a tilting of both said head and said smoothing bar, said smoothing bar having adjacent its smoothing surface means providing a shelf for the collection of an excess of the coating material.

LOUIS J. VAN GUELPEN.

REFERENCES CITED

The following references are of record in the file of this patent:

UNITED STATES PATENTS

| Number | Name | Date |
|---|---|---|
| 1,391,281 | Snyder | Sept. 20, 1921 |
| 1,494,315 | Ostenberg | May 13, 1924 |
| 1,851,538 | Day et al. | Mar. 29, 1932 |
| 1,929,877 | Bonamico | Oct. 10, 1933 |